United States Patent [19]
Itoh et al.

[11] Patent Number: 5,843,573
[45] Date of Patent: Dec. 1, 1998

[54] POLYESTER RESIN COMPOSITION

[75] Inventors: Hiroshi Itoh, Kobe; Yoshinobu Yamamoto, Suita; Koji Fukuhara, Osaka; Hiroya Kobayashi, Minoo, all of Japan

[73] Assignee: Nippon Shokubai Co., Ltd., Osaka, Japan

[21] Appl. No.: 547,837

[22] Filed: Oct. 25, 1995

[30] Foreign Application Priority Data

Oct. 25, 1994 [JP] Japan ................................. 6-260066

[51] Int. Cl.⁶ .......................................... D02G 3/00
[52] U.S. Cl. ...................... 428/364; 528/272; 528/296; 525/437; 524/366; 524/404; 524/451
[58] Field of Search ................... 528/272, 296; 525/437; 524/366, 404, 451; 428/364

[56] References Cited

U.S. PATENT DOCUMENTS

| | | |
|---|---|---|
| 3,883,901 | 5/1975 | Coquard et al. . |
| 5,231,148 | 7/1993 | Kleinke et al. .................. 525/450 |

FOREIGN PATENT DOCUMENTS

| | | |
|---|---|---|
| 0 491 171 A2 | 6/1992 | European Pat. Off. . |
| 0 491 171 A3 | 6/1992 | European Pat. Off. . |
| 0 569 153 A2 | 11/1993 | European Pat. Off. . |
| 0 572 256 A2 | 12/1993 | European Pat. Off. . |
| 0 572 256 A3 | 12/1993 | European Pat. Off. . |
| 46-116 | 1/1971 | Japan . |
| 4-146953 A | 5/1992 | Japan . |
| 6-170941 A | 6/1994 | Japan . |
| 7-179626 A | 7/1995 | Japan . |
| 7-188537 A | 7/1995 | Japan . |
| 7-0304939 A | 11/1995 | Japan . |
| 8-3432 A | 1/1996 | Japan . |
| WO 94/07949 | 4/1994 | WIPO . |

*Primary Examiner*—Samuel A. Acquah
*Attorney, Agent, or Firm*—Kubovcik & Kubovick

[57] ABSTRACT

A polyester resin composition comprises: an aliphatic polyester having a number-average molecular weight (Mn) in a range of 10,000 to 100,000; and a crystalline nucleating agent, wherein the aliphatic polyester and the crystalline nucleating agent are mixed in such that a half value width of an exothermic peak based on an annealing crystallization of the aliphatic polyester measured by differential scanning calorimetry in an atmosphere of nitrogen at a cooling rate of 3K/minute is not more than 15K. This polyester resin composition has a biodegradability and a high crystallization rate. The polyester resin composition also has excellent mechanical properties and eliminates a precise temperature control during a molding process which saves labor force resulting in desirable moldability and productivity. For the described beneficial properties, the polyester resin composition can be readily processed into a fiber, a molded article, sheet, film and the like. Accordingly, a film made of the polyester resin composition can be effectively used for disposable packing materials, miscellaneous goods for daily use, and the like.

38 Claims, 3 Drawing Sheets

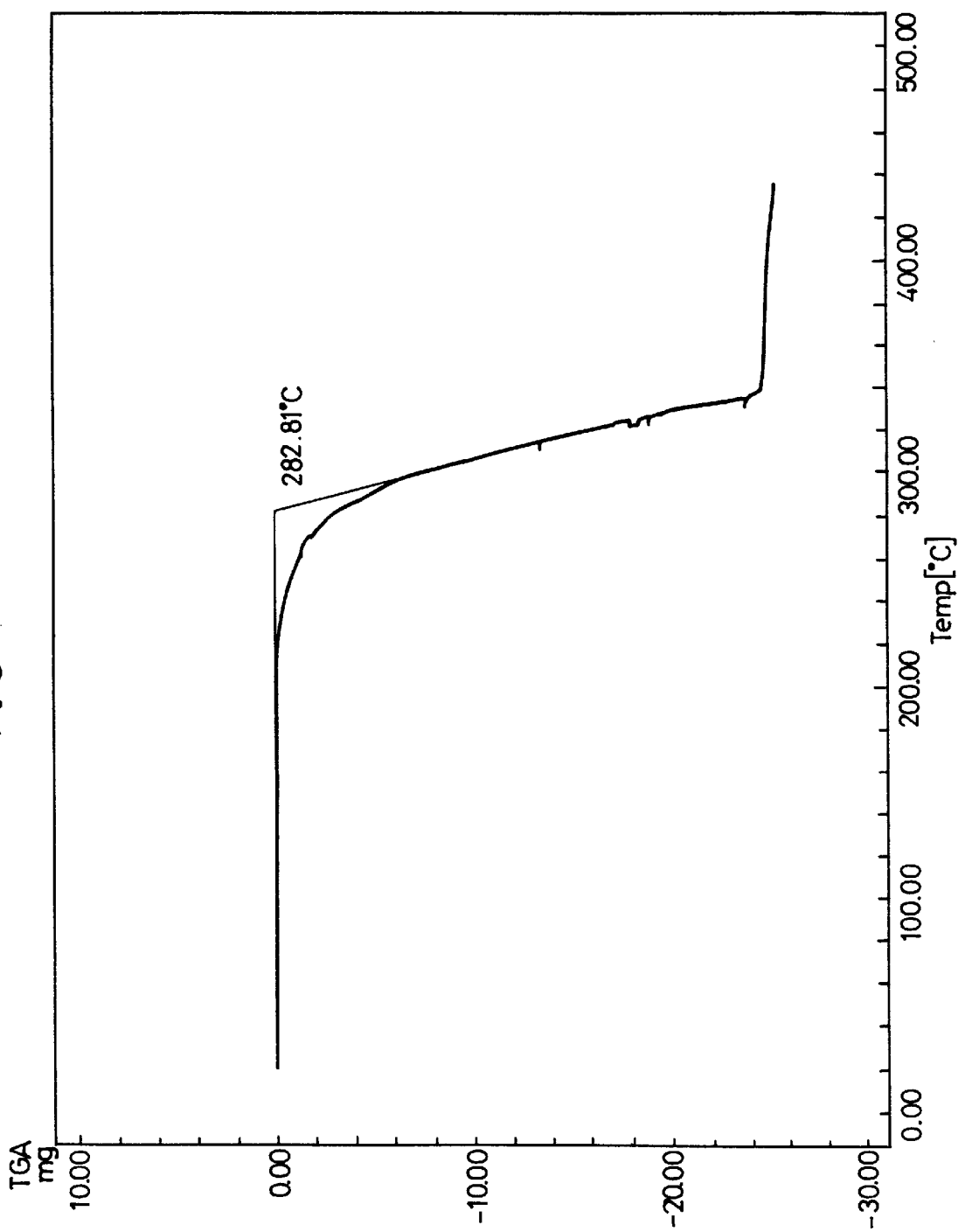

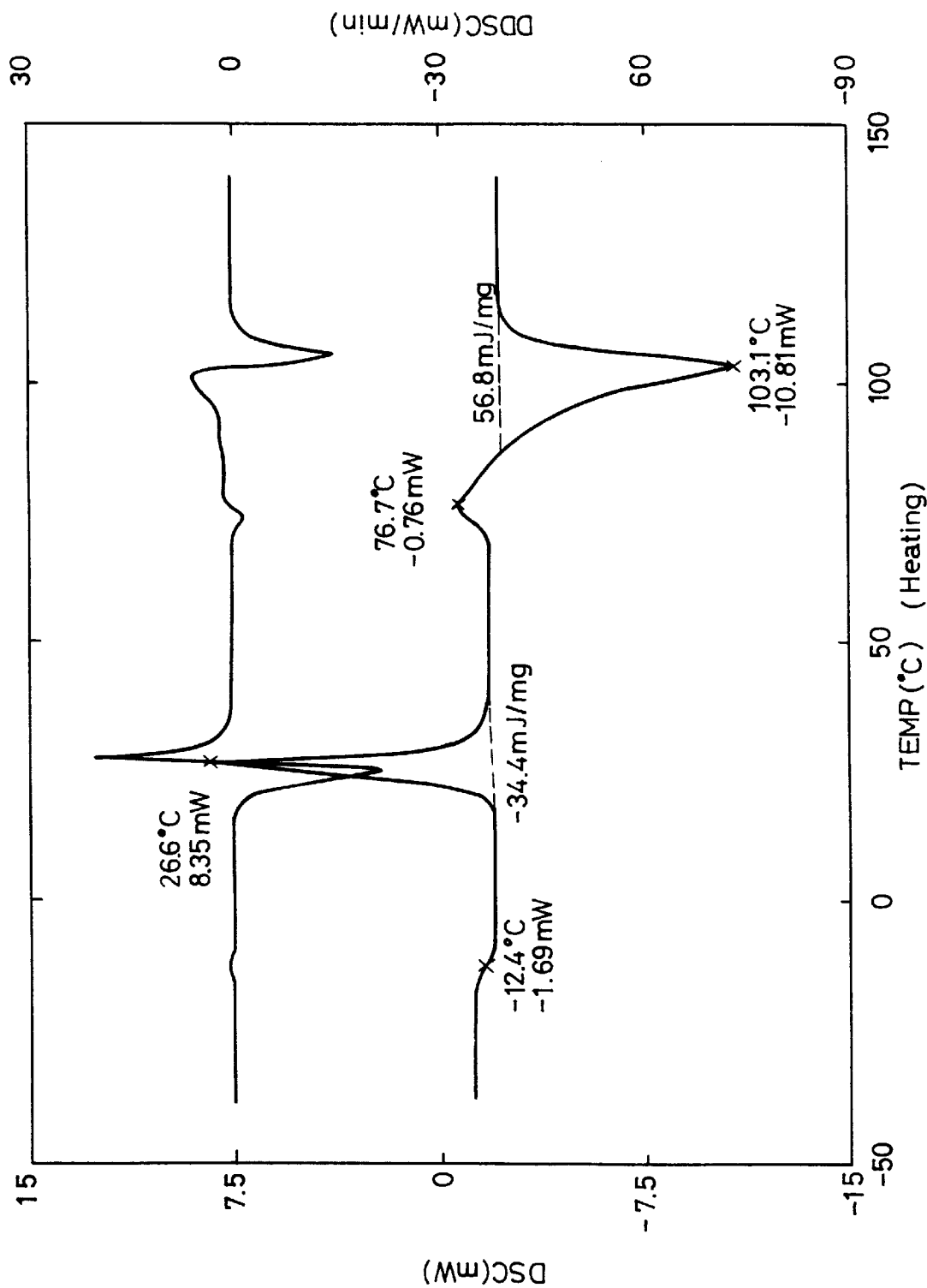

5,843,573

POLYESTER RESIN COMPOSITION

FIELD OF THE INVENTION

The present invention relates to a polyester resin composition having biodegradability. More particularly, the present invention relates to a polyester resin composition having a high crystallization rate and a desirable moldability, that can be readily processed into a fiber, a molded article, a sheet, a film and the like.

BACKGROUND OF THE INVENTION

In general, an aliphatic polyester has biodegradability, and for this beneficial property, it is expected to be used as a fiber, a molded article, a sheet, a film and the like.

However, it is known that a conventional aliphatic polyester has a half value width of an exothermic peak based on an annealing crystallization of the aliphatic polyester measured by DSC (differential scanning calorimetry) at a cooling rate of 3K/minute of not less than 15K. Therefore, the conventional aliphatic polyester is inferior in that its crystallization rate is low, resulting in poor moldability. Namely, it has been found that when forming a film by inflation molding or T-die molding, problems of poor film forming efficiency, or welding of a film to a take-in roll, welding or blocking between films, etc., arise. It has been also found that it is difficult to achieve a desirable injection molded article or an extrusion molded article.

Furthermore, the conventional aliphatic polyester features that its melting point and thermal decomposition temperature (weight-loss starting temperature) relatively approximate each other. For example, polyhydroxybutyric acid (as an example of aliphatic polyester) has a melting point of 177° C. and a thermal decomposition temperature of around 200° C. Polylactic acid (as another example of aliphatic polyester) has a melting point of 180° C. and a thermal decomposition temperature of around 200° C. The inventors of the present invention investigated the moldability of such aliphatic polyester and found that during the molding process, a precise temperature control is required, which requires a great deal of labor force. There is no known art discussing effects of a melting point and a thermal decomposition temperature on the moldability of an aliphatic polyester.

SUMMARY OF THE INVENTION

An object of the present invention is to provide a polyester resin composition having biodegradability, a high crystallization rate and a desirable moldability that can be readily processed into a fiber, a molded article, a sheet, a film and the like.

In order to achieve the above object, a polyester resin composition in accordance with the present invention is characterized by comprising:

an aliphatic polyester having a number-average molecular weight (Mn) in a range of 10,000 to 100,000, and a crystalline nucleating agent, wherein the aliphatic polyester and the crystalline nucleating agent are mixed such that a half value width of an exothermic peak based on an annealing crystallization of the aliphatic ester measured by DSC (differential scanning calorimetry) in an atmosphere of nitrogen at a cooling rate of 3K/minute is not more than 15K. Another polyester resin composition in accordance with the present invention is characterized in that a difference in temperature between a weight-loss starting temperature measured by thermo-gravimetric analysis (TG) in air and a melting point measured by DSC in an atmosphere of nitrogen is not less than 100K and is also characterized by including an aliphatic polyester having a number-average molecular weight in the range of 10,000 to 100, 000.

The polyester resin composition having the described features has biodegradability and a high crystallization rate. Moreover, the polyester resin composition also exhibits excellent mechanical properties and eliminates the need of precise temperature control during a molding process which saves labor force, thereby achieving a desirable moldability and productivity. Accordingly, a polyester resin composition in accordance with the present invention can be readily processed into a fiber, a molded article, a sheet, a film and the like. The film made from such polyester resin composition is effectively used for disposable packing materials, miscellaneous goods for daily use, and the like.

For a fuller understanding of the nature and advantages of the invention, reference should be made to the ensuing detailed description taken in conjunction with the accompanying drawings.

BRIEF DESCRIPTION OF THE DRAWINGS

FIG. 2 is a chart showing results of measurements by thermo-gravimetric analysis (TG) of a polyester resin composition in accordance with another example of the present invention; and FIG. 3 is a chart showing results of measurements by DSC of the polyester resin composition of FIG. 2.

DESCRIPTION OF THE EMBODIMENTS

Figure 1:
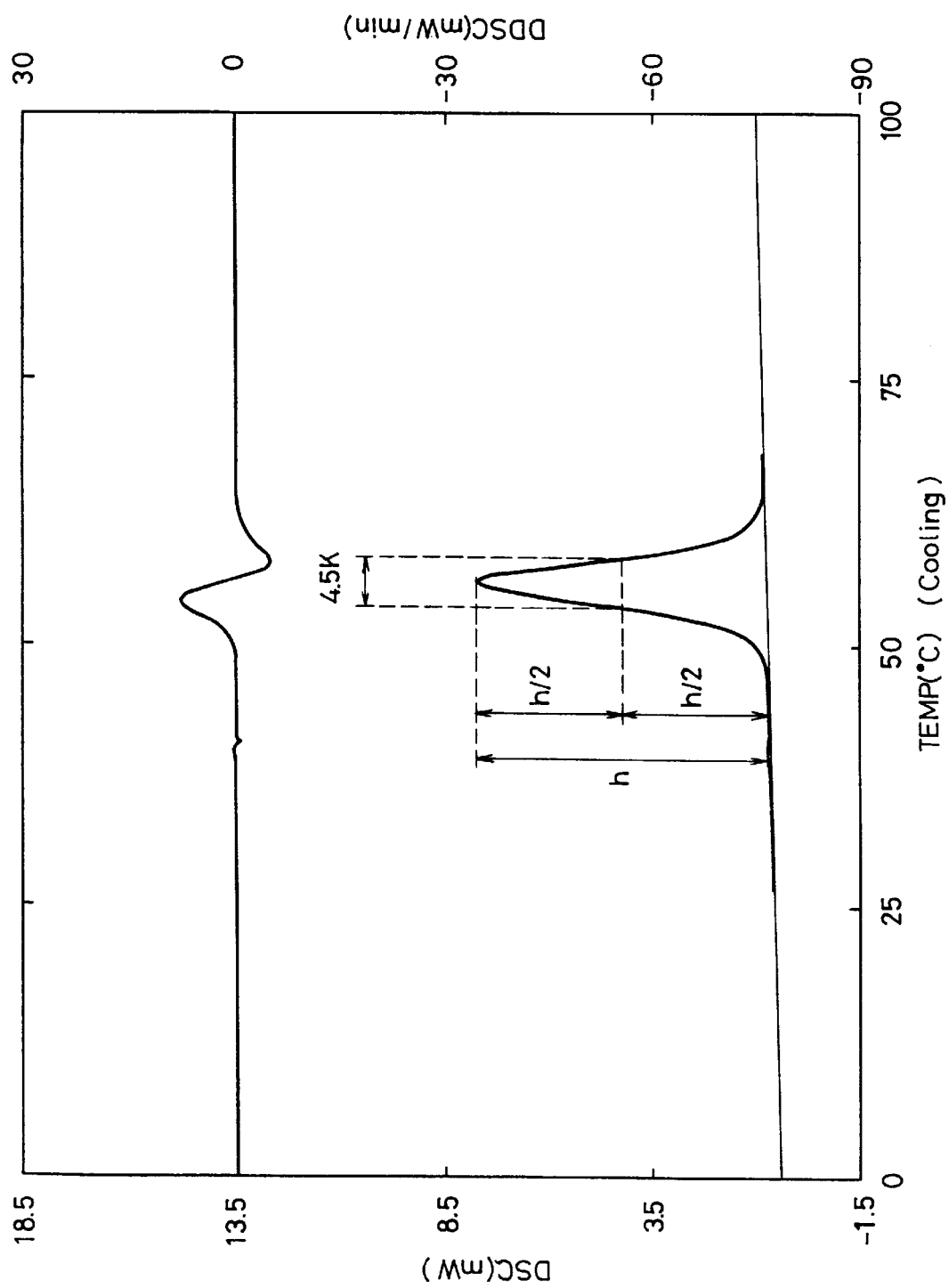
FIG. 1 is a chart showing results of measurements by DSC (differential scanning calorimetry) of a polyester resin composition in accordance with one example of the present invention.

An aliphatic polyester in accordance with the present invention has a number-average molecular weight (Mn) in the range of 10,000 to 100,000. In view of heat resistance, mechanical strength, etc., the number-average molecular weight of the aliphatic polymer is preferably not less than 25,000, more preferably, not less than 40,000. In the case where the number-average molecular weight is less than 10,000, when molding into, for example, a film, problems will arise in that the aliphatic polyester is frangible or cannot be extended. Thus, such aliphatic polyester is industrially unpreferable. The aliphatic polyester having a number-average molecular weight of less than 10,000 can be polymerized by a reaction with a chain-elongating agent (crosslinking agent). However, this increases the number of steps required in the reaction process. Moreover, the crosslinking agent used in the reaction may cause a fish eye on a film. Thus, the aliphatic polyester having a number-average molecular weight of less than 10,000 is industrially unpreferable. On the other hand, when an aliphatic polyester having a number-average molecular weight of not less than 100,000 is adopted, a long time is required for the reaction, thus such aliphatic polyester is industrially unpreferable. When a long time is required for the reaction, a volatile component generated by the decomposition, etc., of the aliphatic polyester will increase. For this reason, the number-average molecular weight is preferably not more than 80,000, more preferably not more than 70,000. Namely, the number-average molecular weight of the aliphatic polyester preferably falls in the range of 25,000 to 80,000, more preferably in the range of 40,000 to 70,000.

It is also preferable that the aliphatic polyester in accordance with the present invention has a difference in temperature between a weight-loss starting temperature measured by thermo-gravimetric analysis (TG) in air and a melting point measured by DSC in an atmosphere of nitrogen of not less than 100K, preferably not less than 150K. When the difference in temperature is less than 100K, a precise temperature control is required during the molding process, which requires a great deal of labor force. Thus, such aliphatic polyester is industrially unpreferable.

In the present invention, the molecular weight-loss starting temperature suggests a temperature measured in air at a temperature elevation rate of 10K/minute by a general thermal analytical instrument (thermo-gravimetric analytical instrument), and the melting point suggests a temperature measured in an atmosphere of nitrogen at a temperature elevation rate of 6K/minute by a general thermal analytical instrument (differential scanning calorimetry instrument). The measurements by the thermo-gravimetric analysis and the differential scanning calorimetry, i.e., the measurement of a weight-loss starting temperature and a melting point are performed in a manner to be described later.

The method of producing an aliphatic polyester is not especially limited. However, examples of the method include:

(I) a polycondensation reaction of aliphatic dicarboxylic acid as a polybasic acid (or ester thereof) with an aliphatic glycol;

(ii) a polycondensation reaction of aliphatic hydroxy carboxylic acid (or ester thereof);

(iii) a ring-opening polymerization reaction of cyclic acid anhydride with a cyclic ether; and (iv) a ring-opening polymerization reaction of a cyclic ester.

Examples of the aliphatic dicarboxylic acid used in the method (i) include: succinic acid, adipic acid, suberic acid, sebacic acid, azelaic acid, decandicarboxylic acid, octadecandicarboxylic acid, dimer acid, esters thereof, and the like. Only one kind of the above-listed aliphatic dicarboxylic acid may be adopted, or two or more kinds thereof may be suitably mixed and adopted.

Examples of the aliphatic glycol include: ethylene glycol, propylene glycol, 1,3-propanediol, 1,4-butanediol, neopentyl glycol, 1,5-pentanediol, 1,6-hexanediol, decamethylene glycol, and the like. It is permitted to substitute polyoxyalkylene glycol for part of the aliphatic glycol. Examples of such polyoxyalkylene glycol include: polyoxyethylene glycol, polyoxypropylene glycol, polyoxytetramethylene glycol, copolymers thereof, and the like. It is also permitted to substitute polyhydric alcohol having at least three functional groups for part of the aliphatic glycol. Examples of such polyhydric alcohol include: glycerol, trimethylolpropane, pentaerythritol, and the like. It is permitted to substitute diepoxide for part of the aliphatic glycol. Examples of such diepoxide include: polyethylene glycol diglycidyl ether, polypropylene glycol diglycidyl ether, polytetramethylene glycol diglycidyl ether, resorcinol diglycidyl ether, neopentyl glycol diglycidyl ether, 1,6-hexanediol diglycidyl ether, diglycidyl adipate, diglycidyl o-phtalate, diglycidyl terephthalate, hydroquinone diglycidyl ether, bisphenol S diglycidyl ether, glycerol diglycidyl ether, sorbitol polyglycidyl ether, sorbitan polyglycidyl ether, polyglycerol polyglycidyl ether, pentaerythritol polyglycidyl ether, diglycerol polyglycidyl ether, triglycidyl tris(2-hydroxyethyl)isocyanurate, glycerol triglycidyl ether, trimethylol propane polyglycidyl ether, and the like. only one kind of the above-listed aliphatic glycol may be adopted, or two or more kinds thereof may be suitably mixed and adopted.

In view of melting point, biodegradability, cost performance, etc., of the resulting aliphatic polyester, for a combination of an aliphatic dicarboxylic acid and an aliphatic glycol, a combination of an aliphatic dicarboxylic acid having 2–6 carbon atoms and an aliphatic glycol having 2–4 carbon atoms is preferable, and a combination of succinic acid and ethylene glycol and/or 1,4-butanediol is more preferable.

In preparing such an aliphatic polyester, an aliphatic dicarboxylic acid (or ester thereof) and an aliphatic glycol may be initially mixed all at once, or they can be added gradually as the reaction progresses. In the polycondensation reaction, a degree of polymerization is raised by carrying out an ester exchange reaction subsequent to a general esterification reaction. Here, it is not necessary that the ester exchange reaction and the esterification reaction are clearly distinguishable. Such ester exchange reaction and the esterification reaction are carried out in the presence of a catalyst. In addition, a combined reaction of the esterification reaction by dewatering condensation and the ester exchange reaction may be carried out in such a manner that after carrying out the esterification reaction in an absence of a catalyst, the ester exchange reaction is carried out in the presence of a catalyst.

Examples of the aliphatic hydroxycarboxylic acid used in method (ii) include: glycolic acid, lactic acid, 3-hydroxypropionic acid, 3-hydroxy-2,2-dimethylpropionic acid, 3-hydroxy -3-methylbutyric acid, 4-hydroxy butyric acid, 5-hydroxy valeric acid, 3-hydroxy butyric acid, 3-hydroxy valeric acid, 4-hydroxy valeric acid, 6-hydroxy caproic acid, citric acid, malic acid, esters thereof, and the like. Only one kind of the above-listed aliphatic dicarboxylic acid may be used, or two or more kinds thereof may be suitably mixed and adopted.

In method (ii), the polycondensation reaction may be carried out by a general ester-exchange reaction or esterification reaction or a combination thereof.

The catalyst used in the metal (i) is not especially limited, and known catalysts may be used. Examples of the catalyst used in the methods (i) and (ii) include: organometallic compounds including at least one metal selected from a group consisting of: titanium, germanium, zinc, iron, manganese, cobalt, zirconium, hafnium, banadium, iridium, lanthanum, cerium, lithium, calcium, magnesium, tin, barium, nickel, etc.; organic acid salts, metal alkoxide, metallic oxide, metal hydroxide, carbonate, phosphate, sulfate, nitrate, chloride, and the like. Only one kind of the above-listed catalysts may be adopted, or two or more kinds thereof may be suitably mixed and adopted. The amount for use of the catalyst is not especially limited, however, it is usually in the range of 0.001 part by weight to 5 parts by weight based on 100 parts by weight of aliphatic polyester, preferably in the range of 0.01 part by weight to 0.5 part by weight.

The cyclic acid anhydride used in method (iii) is not especially limited, and any cyclic acid anhydride having at least one acid anhydride in a molecule may be used. Additionally, to obtain an aliphatic polyester having cyclic acid anhydride and a cyclic ether which are linearly bonded, a cyclic acid anhydride having one acid anhydride in a molecule is preferably adopted. Examples of such cyclic acid anhydride include: an acid anhydride such as succinic anhydride, maleic anhydride, itaconic anhydride, glutaric anhydride, adipic anhydride, citraconic anhydride, phthalic acid, trimellitic anhydride, and the like, polyfunctional acid anhydride such as pyromellitic dianhydride, benzophenone tetracarboxylic dianhydride, 1,2,3,4-butanetetracarboxylic dianhydride, homopolymers of maleic anhydride, copolymers of maleic anhydride with polyvinyl acetate, ethylene, isobutylene, isobutyl vinyl ether, acrylonitrile or styrene, and the like. Only one kind of the above-listed cyclic acid anhydride may be adopted, or two or more kinds thereof may be suitably mixed and adopted.

The cyclic ether used in method (iii) is not especially limited, and any cyclic acid anhydride having at least one acid anhydride in a molecule may be used. Additionally, to obtain aliphatic polyester having a cyclic acid anhydride and a cyclic ether which are linearly bonded, a cyclic ether having one epoxy group in a molecule is preferably adopted.

Examples of such cyclic ether include: ethylene oxide, propylene oxide, cyclohexene oxide, styrene oxide, epichlorohydrin, allyl glycidyl ether, phenyl glycidyl ether, tetrahydrofuran, oxepane, 1,3-dioxolane; polyethylene glycol diglycidyl ether, polypropylene glycol diglycidyl ether, polytetramethylene glycol diglycidyl ether, resorcinol diglycidyl ether, neopentyl glycol diglycidyl ether, 1,6-hexanediol diglycidyl ether, diglycidyl adipate, diglycidyl o-phthalate, diglycidyl terephthalate, hydroquinone diglycidyl ether, bisphenol S diglycidyl ether, glycerol diglycidyl ether, sorbitol polyglycidyl ether, sorbitan polyglycidyl ether, polyglycerol polyglycidyl ether, pentaerythritol polyglycidyl ether, diglycerol polyglycidyl ether, triglycidyl tris(2-hydroxyethyl)isocyanurate, glycerol triglycidyl ether, trimethylol propane polyglycidyl ether, and the like. only one kind of the above-listed cyclic ether may be adopted, or two or more kinds thereof may be suitably mixed and adopted.

For a combination of a cyclic acid anhydride and a cyclic ether, a cyclic acid anhydride having succinic anhydride as a main component and a cyclic ether having ethylene oxide as a main component is preferable, and a combination of succinic anhydride and ethylene oxide is more preferable taking the melting point, biodegradability and cost performance of the aliphatic polyester into consideration.

Examples of cyclic ether used in the method (iv) include: β-methyl-β-propiolactone, δ-valerolactone, ε-caprolactone, glycolide, lactide, and the like. Only one kind of the above-listed cyclic ether may be adopted, or two or more kinds thereof may be suitably mixed and adopted.

In methods (iii) and (iv), the ring-opening polymerization reaction may be carried out by such a polymerization method as polymerization in a solvent, bulk polymerization and the like in the presence of a conventional catalyst (ring-opening polymerization catalyst).

Among the above-mentioned methods (i)–(iv), method (iii) is preferable because it enables an aliphatic polyester to be produced with industrially good efficiency in a relatively short period of time. The method (iii) will be explained in more detail below.

Conventionally, it is known that a cyclic acid anhydride such as succinic anhydride is not polymerized alone. The inventors of the present invention have found that by the ring-opening polymerization reaction of the cyclic acid anhydride by gradually introducing a cyclic ether in the presence of the catalyst, an aliphatic polyester in which an acid component and an alcohol component are alternatively copolymerized in practice can be manufactured in a relatively short period of time.

The ring-opening polymerization reaction may be performed by such a polymerization method as polymerization in a solvent, bulk polymerization, and the like. In the case of the polymerization in a solvent, the cyclic acid anhydride is used in a solution state. In the case of the bulk polymerization, the cyclic acid anhydride is used in a melting state. The polymerization in a solvent may be performed in either a batch manner or continuous manner.

Examples of the solvent as used on this occasion are inert solvents such as benzene, toluene, xylene, cyclohexane, n-hexane, dioxane, chloroform, dichloroethane and the like. Only one kind of the above-listed solvent may be adopted, or two or more kinds thereof may be suitably mixed and adopted.

Examples of the catalyst include: metal alkoxides such as tetramethoxyzirconium, tetraethoxyzirconium, tetra-iso-propoxyzirconium, tetra-iso-butoxyzirconium, tetra-n-butoxyzirconium, tetra-t-butoxyzirconium, triethoxyaluminum, tri-n-propoxyaluminum, tri-iso-propoxyaluminum, tri-n-butoxyaluminum, tri-iso-butoxyaluminum, tri-sec-butoxyaluminum, mono-sec-butoxy-di-iso-propoxyaluminum, diisopropoxyaluminum ethylacetoacetate, aluminum tris(ethylacetoacetate), tetraethoxytitanium, tetra-iso-propoxytitanium, tetra-n-propoxytitanium, tetra-n-butoxytitanium, tetra-sec-butoxytitanium, tetra-t-butoxytitanium, tri-iso-propoxygallium, tri-iso-propoxyantimony, tri-iso-butoxyantimony, trimethoxyboron, triethoxyboron, tri-iso-propoxyboron, tri-n-propoxyboron, tri-iso-butoxyboron, tri-n-butoxyboron, tri-sec-butoxyboron, tri-t-butoxyboron, tri-iso-propoxygallium, tetramethoxy germanium, tetraethoxygermanium, tetra-iso-propoxygermanium, tetra-n-propoxygermanium, tetra-iso-butoxygermanium, tetra-n-butoxygermanium, tetra-sec-butoxygermanium, tetra-t-butoxygermanium, and the like; metal halides such as antimony pentachloride, zinc chloride, lithium bromide, tin(IV) chloride, cadmium chloride, boron trifluoride diethyl ether, and the like; alkyl aluminum such as trimethylaluminum, triethylaluminum, diethylaluminum chloride, ethylaluminum dichloride, tri-iso-butylaluminum, and the like; alkyl zinc such as diethyl zinc, diisopropyl zinc, and the like; tertiary amine such as triallyl amine, triethyl amine, tri-n-octyl amine, benzyldimethyl amine, and the like, heteropoly acid such as tungstophosphoric acid, molybdophosphoric acid, etc., or an alkali metal salt thereof; zirconium compounds such as zirconium chloride oxide, zirconyl n-octanoate, zirconyl stearate, zirconyl propionate, zirconyl nitrate, etc., and the like.

Among the above-listed catalysts, zirconyl n-octanoate, tetraalkoxy zirconium, and trialkoxy aluminum are especially preferable. The amount for use of the catalyst is not especially limited, however, it is usually in the range of 0.001 part by 5 weight—10 parts by weight based on a total amount of the cyclic acid anhydride and cyclic ether. The manner of introducing the catalyst is not especially limited. For example, the catalyst may be added to the cyclic anhydride, or may be added gradually.

A polymerization temperature is not especially limited as long as it is a temperature at which the cyclic acid anhydride and the cyclic ether react with each other. However, the temperature is preferably in the range of 10° C. to 250° C., more preferably in the range of 50° C. to 150° C., and still more preferably in the range of 100° C. to 150° C.

When the ring-opening copolyrerization reaction is performed, an inside pressure of a reaction vessel (reaction system) is different according to factors such as a combination of a cyclic acid anhydride and a cyclic ether, a reaction temperature, the presence or absence of a solvent, and as to the kind of solvent present. However, it is preferable that a reaction vessel has an inside pressure within the range of atmospheric pressure to 50 kgf/cm$^2$, more preferably within the range of atmospheric pressure to 15 kgf/cm$^2$. Taking the fact that a reaction pressure increases by introducing a cyclic ether into the reaction system into consideration, it is preferable that the cyclic ether is gradually added to the reaction system so as to maintain the reaction pressure at a constant value in the above-mentioned range. Here, an increase in the amount of an unreacted cyclic ether, accompanied with increase in pressure owing to successive introduction of the cyclic ether, unpreferably increases polyester content in a reaction product.

For the above-mentioned reasons, the successive introduction of the cyclic ether into a reaction vessel is so performed that the rate per hour of introducing the cyclic ether is within the range of 3 parts by weight to 90 parts by weight, preferably 5 parts by weight to 50 parts by weight based on 100 parts by weight of the cyclic acid anhydride. In the case where the rate per hour of introducing the cyclic ether is lower than the lower limit of 3 parts by weight, a reaction period becomes long and productivity becomes poor, which is industrially unpreferable. On the other hand, in the case where the rate is higher than the upper limit of 90 parts by weight, a polyether content in a reaction product increases so that there is obtained only a polyester having a low melting point, which is also industrially unpreferable. In the present invention, the successive introduction of the cyclic ether means not mixing a cyclic ether with a cyclic acid anhydride all at once and may be either continuous dropwise introduction of a cyclic ether into a reaction system or intermittent introduction separating the process into multiple steps. It is preferable to perform continuous introduction in such a manner that the introducing amount does not vary much with time.

In the present invention, a mole ratio of the reaction between the cyclic acid anhydride and the cyclic ether (cyclic acid anhydride/cyclic ether) is preferably in the range of 40/60 to 60/40. Taking the fact that a terminal carboxyl group of an aliphatic polyester and cyclic acid anhydride remaining in the aliphatic polyester lower the properties of the aliphatic polyester, the mole ratio is preferably in the range of 40/60 to 49/51 in which the cyclic ether is in an excessive amount. When the ratio is in the above-mentioned range, a content of the terminal carboxylic group is less than 50 percent of all terminal groups of the aliphatic polyester, which raises a weight-loss starting temperature of the aliphatic polyester, thereby improving a heat resistance. If the ratio deviates from the above-mentioned range, the amount of an unreacted monomer will increase, resulting in a low yield of the aliphatic polyester.

A reaction time is not especially limited, and it should be set according to factors such as a combination of a cyclic anhydride and a cyclic ether, a reaction pressure, a reaction temperature, the presence or absence of a solvent, the kind of a solvent present and a time required for introducing the cyclic ether.

In the present invention, it is preferable to gradually introduce the cyclic ether in a defined amount determined based on the mole ratio and then perform an ageing reaction by continuing a polymerization reaction at the aforementioned reaction temperature. After the completion of the ageing reaction, the resulting aliphatic polyester can be easily separated from the reaction system.

In any of the above-mentioned methods (i)–(iv), an aliphatic polyester having a number-average molecular weight of not less than 10,000 can be formed. If the resulting aliphatic polyester has a number-average molecular weight of less than 10,000, the aliphatic polyester may be further subjected to a general ester exchange reaction so as to polymerize it to have a number-average molecular weight of not less than 10,000. Alternatively, such aliphatic polyester can be polymerized also by reacting with a chain-elongating agent of various kinds (cross-linking agent).

Examples of the chain-elongating agent include: isocyanate compounds, epoxy compounds, aziridine compounds, oxazoline compounds, polyvalent metal compounds, polyfunctional acid anhydride, phosphoric ester, phosphorous ester, and the like. Only one kind of the above-listed chain-elongating agents may be adopted, or two or more kinds thereof may be suitably mixed and adopted. A temperature at which the aliphatic polyester is reacted with the chain-elongating agent is not especially limited. However, the reaction is preferably performed at a temperature in the range of 20° C. to 250° C., more preferably in the range of 100° C. to 200° C. The method of reacting the aliphatic polyester with the change-elongating agent is not especially limited. However, examples of such methods include: a method wherein the aliphatic polyester is dissolved in an appropriate solvent, and subsequently is reacted with the chain-elongating agent; and a method wherein the aliphatic polyester is melted by heating, and subsequently is reacted with the chain-elongating agent.

The isocyanate compounds used in the present invention are not especially limited, and any isocyanate compound having at least two isocyanate groups in a molecule may be used. Examples of such isocyanate compounds include: isocyanate compounds such as tolylene diisocyanate (TDI), 4,4'-diphenylmethane diisocyanate (MDI), hexamethylene diisocyanate, xylylene diisocyanate, methaxylylene diisocyanate, 1,5-naphthalene diisocyanate, hydrogenated diphenyl methane diisocyanate, hydrogenated tolylene diisocyanate, xylylene hydride diisocyanate, isophorone diisocyanate, and the like; burette polyisocyanate compounds such as Sumidur N (available from Sumitomo Bayer Urethane Co., Ltd.), and the like; polyisocyanate compounds having an isocyanate ring such as Desmodur IL, HL (available from Bayer AG Co., Ltd.), Coronate EH (available from Japan Polyurethane Kogyo Co., Ltd.) and the like; adduct polyisocyanate compounds such as Sumidur L (available from Sumitomo Bayer Urethane Co., Ltd.), Coronate HL (available from Japan Polyurethane Kogyo Co., Ltd.); and the like. In addition, a block isocyanate compound may be used. Only one kind of the above-listed isocyanate compounds may be adopted, or two or more kinds thereof may be suitably mixed and adopted.

When performing a urethane reaction between an aliphatic polyester and an isocyanate compound, the ratio of the respective contents is not especially limited. However, it is preferable, for example, that a mole ratio of an isocyanate group in the isocyanate compound and a terminal hydroxyl group in the aliphatic polyester (isocyanate group/hydroxyl group) is in the range of 0.5 to 3.0, more preferably in the range of 0.8 to 1.5. To accelerate the urethane reaction, a known urethane catalyst such as an organic tin compound, a tertiary amine, etc., may be used as occasion demands.

The epoxy compound used in the present invention is not especially limited, and any epoxy compound having at least two epoxy groups in a molecule may be used. Examples of such epoxy compound include: polyethylene glycol diglycidyl ether, polypropylene glycol diglycidyl ether, polytetramethylene glycol diglycidyl ether, resorcinol diglycidyl ether, neopentyl glycol diglycidyl ether, 1,6-hexanediol diglycidyl ether, diglycidyl adipate, diglycidyl o-phthalate, diglycidyl terephthalate, hydroquinone diglycidyl ether, bisphenol S diglycidyl ether, glycerol diglycidyl ether, sorbitol polyglycidyl ether, sorbitan polyglycidyl ether, polyglycerol polyglycidyl ether, pentaerythritol polyglycidyl ether, diglycerol polyglycidyl ether, triglycidyl tris(2-hydroxyethyl)

isocyanurate, glycerol triglycidyl ether, trimethyl propane polyglycidyl ether, and the like. Only one kind of the above-listed epoxy compounds may be adopted, or two or more kinds thereof may be suitably mixed and adopted.

A manner of a reaction between an aliphatic polyester and an epoxy compound is not especially limited. To accelerate the above reaction, a known catalyst, such as a tertiary amine, quaternary ammonium salts, imidazole compounds, and the like may be used as occasion demands. Alternatively, epoxy compounds may be introduced while the aliphatic polyester is being produced. To be more specific, cyclic acid anhydrides, cyclic ethers, and epoxy compounds may be reacted by the ring-opening polymerization. Also, the resulting product of the above ring-opening polymerization reaction may be further subject to a reaction with epoxy compounds.

The aziridine compounds are not especially limited. Examples of the aziridine compound include: 2,2'-bis (hydroxymethyl)butanol-tris[3-(1-aziridinyl)propionate], ethyleneglycol-bis[3-(1-aziridinyl)propionate], polyethyleneglycol-bis[3-(1-aziridinyl)propionate], propyleneglycol-bis[3-(1-aziridinyl)propionate], polypropyleneglycol-bis[3-(1-aziridinyl)propionate], tetramethyleneglycol-bis[3-(1-aziridinyl)propionate], polytetramethyleneglycol-bis[3-(1-aziridinyl)propionate], N,N'-tetramethylenebisethylene urea, N,N'-pentamethylenebisethylene urea, N,N'-hexamethylenebisethylene urea, N,N'-heptamethylenebisethylene urea, N,N'-octamethylenebisethylene urea, N,N'-phenylenebisethylene urea, N,N'-tolylenebisethylene urea, N,N'-diphenyl-4,4'-bisethylene urea, 3,3'-dimethyldiphenyl-4,4'-bisethylene urea, 3,3'-dimethoxydiphenyl-4,4'-bisethylene urea, diphenylmethane-p, p-bisethylene urea, and the like. only one kind of the above-listed compounds may be adopted, or two or more kinds thereof may be suitably mixed and adopted. The amount of aziridine compounds in the aliphatic polyester is preferably in the range of 0.001 part by weight to 10 parts by weight, and more preferably, in the range of 0.01 part by weight to 5 parts by weight.

The oxazoline compounds are not especially limited. Examples of the oxazoline compounds include: 2-oxazoline, 2-methyl-2-oxazoline, 2-ethyl-2-oxazoline, 2-isopropyl-2-oxazoline, 2-butyl-2-oxazoline, 2-phenyl-2-oxazoline, 2,2'-bis(2-oxazoline), 2,2'-methylene-bis(2-oxazoline), 2,2'-ethylene-bis(2-oxazoline), 2,2'-trimethylene-bis(2-oxazoline), 2,2'-tetramethylene-bis-(2-oxazoline) ,2,2'-hexamethylene-bis(2-oxazoline), 2,2'-octamethylene-bis(2-oxazoline), 2,2'-ethylene-bis(4,4'-dimethyl-2-oxazoline), 2,2'-p-phenylene-bis(2-oxazoline), 2,2'-m-phenylene-bis-(2-oxazoline), 2,2'-m-phenylene-bis-(4,4'-dimethyl-2-oxazoline), bis-(2-oxazolinylcyclohexane) sulfide, bis-(2-oxazolinylnorbornane) sulfide, and the like. Only one kind of the above-listed compounds may be adopted, or two or more kinds thereof may be suitably mixed and adopted. Among the above-listed oxazoline compounds, 2,2'-m-phenylene-bis-(2-oxazoline) and bis-(2-oxazolinylnorbornane) sulfide are especially preferable.

A reaction ratio between the aliphatic polyester and oxazoline compounds is not especially limited. However, for example, the mole ratio of 2-oxazoline group in the oxazoline compound to a terminal carboxyl group in the aliphatic polyester (i.e., 2-oxazoline group/carboxyl group) is preferably in the range of 0.5 to 10.0, and more preferably in the range of 0.8 to 5.0. To accelerate the reaction, a known catalyst, such as amine salts of acidic compounds, and the like may be used as occasion demands.

The polyvalent metal compounds used in the present invention are not specifically limited. Examples of the polyvalent metal compounds include: organometallic compounds, metal salts, metal alkoxides, and the like having at least two valences. Preferable metals for the organometallic compounds or metal salts are, for example, zinc, calcium, copper, iron, magnesium, cobalt, barium, and the like. More preferable for the organometallic compounds and metal salts are zinc(II)acetylacetonate, zinc acetate, zinc formate, zinc propionate, zinc carbonate, and the like in which counter anions of the polyvalent metal compounds can be separated and recovered as volatile components from a reaction system after neutralization. Examples of the metal alkoxides include: aluminum isopropoxide, mono-sec-butoxyaluminum diisopropoxide, aluminum ethoxide, tetraisopropoxytitanium, tetra-n-butoxytitanium, tetra(2-ethylhexyloxy)titanium, tetrastearyloxytitanium, and the like. Only one kind of the above-listed compounds may be adopted, or two or more kinds thereof may be suitably mixed and adopted.

A reaction ratio between an aliphatic polyester and a polyvalent metal compound is not especially limited. However, in the case where the polyvalent metal compounds are either organometallic compounds or metal salts (hereinafter referred to as organometallic compound and the like), the mole ratio of the organometallic compound and the like to a terminal carboxyl group aliphatic polyester (i.e., organometallic compounds/carboxyl group) is preferably in the range of 0.1 to 2.0, and more preferably in the range of 0.2 to 1.2. In the case of a reaction between a hydroxyl group at a terminal end of the aliphatic polyester and a metal alkoxide, for example, the mole ratio of the organometallic compounds and the like to a hydroxyl group at a terminal end of the aliphatic polyester (i.e., metal compounds/hydroxyl group) is preferably in the range of 0.1 to 2.0, and more preferably in the range of 0.2 to 1.2.

The polyfunctional acid anhydrides are not especially limited. Examples of the polyfunctional anhydrides include: pyromellitic dianhydrides, benzophenonetetracarboxylic dianhydrides, butane-1,2,3,4-tetracarboxylic dianhydride, homopolymers of maleic anhydride, copolymers of maleic anhydride with polyvinyl acetate, ethylene, isobutylene, isobutyl vinyl ether, acrylonitrile or styrene, and the like. Only one kind of the above-listed polyfunctional acid anhydrides may be adopted, or two or more kinds thereof may be suitably mixed and adopted. An amount for use of the polyfunctional anhydrides in the aliphatic polyester is preferably in the range of 0.001 part by weight to 10 parts by weight, and more preferably, in the range of 0.01 part by weight to 5 parts by weight.

A manner of a reaction between the aliphatic polyester and polyfunctional acid anhydrides is not especially limited. The polyfunctional acid anhydrides may be introduced while the aliphatic polyester is being produced. To be more specific, cyclic acid anhydrides, cyclic ethers, and polyfunctional acid anhydrides may be reacted through the ring-opening polymerization reaction. Also, the resulting product of the above ring-opening polymerization reaction may be further subjected to a reaction with a polyfunctional acid anhydride.

The phosphoric ester and phosphorous ester in the present invention may be either a diester or triester. Examples of the ester group include: a methyl group, an ethyl group, a propyl group, a butyl group, a phenyl group, a 2-ethylhexyl group, and the like. Among the above-listed ester groups, the methyl group, the ethyl group, and the phenyl group are especially preferable taking reactivity, cost performance, etc., into consideration. Only one kind of the above-listed phosphoric ester and phosphorous ester may be adopted, or two or more kinds thereof may be suitably mixed and adopted. A content of the phosphoric acid ester and phosphorous acid ester in the aliphatic polyester is preferably in the range of 0.001 part by weight to 10 parts by weight, and more preferably, in the range of 0.01 part by weight to 5 parts by weight.

The aliphatic polyester can have a larger molecular weight when reacted with a chain-elongating agent.

In the present invention, the crystalline nucleating agent is defined as compounds having an average particle diameter of not more than 50 μm after a polyester resin composition is formed. When processing the polyester resin composition into a film, the average particle diameter is preferably not more than 10 μm to prevent degradation of the appearance caused by fish eye.

The crystalline nucleating agent is not especially limited as long as it retains the average particle diameter of not more than 50 μm after a polyester resin composition is formed. Examples of the crystalline nucleating agent include:

1) non-organic compounds, such as carbon black, calcium carbonate, synthetic silicic acid and silicate salt, zinc white, high-sight clay, kaolin, basic magnesium carbonate, mica, talc, quartz powder, diatomaceous earth, dolomite powder, titanium oxide, zinc oxide, antimony oxide, barium sulfate, calcium sulfate, alumina, calcium silicate, and boron nitride;

2) low molecular weight organometallic compounds containing metal salts having a carboxyl group, such as metal salts of octanoic acid, toluic acid, heptaroic acid, pelargonic acid, lauric acid, myristic acid, palmitic acid, stearic acid, behenic acid, cerothic acid, montanic acid, mellitic acid, benzoic acid,p-t-butylbenzoic acid, terephthalic acid, monomethylester terephthalate, isophthalic acid, monomethylester isophthalate, and the like;

3) high molecular organometallic compounds containing metal salts having a carboxyl group, such as metal salts of polyethylene containing a carboxyl group obtained by oxidizing polyethylene, polypropylene containing a carboxyl group obtained by oxidizing polypropylene, copolymers of (meth)acrylic acid with an olefin, such as ethylene or propylene, and 1-butene, co-polymers of (meth)acrylic acid with styrene. copolymers of maleic anhydride with the above-mentioned olefin, end copolymers of maleic anhydride with styrene;

4) polymeric organic compounds such as polymers of y-branch α-olefin having at least five carbon atoms such as 3,3-dimethyl-1-butene, 3-methyl-1-butene, 3-methyl-1-pentene, 3-methyl-1-hexene, 3,5,5-trimethyl-1-hexene, and the like, polymers of vinylcycloalkane including vinyl cyclopentane, vinylcyclohexane, vinylnorbornane, and the like, polyalkyleneglycol including polyethyleneglycol, polypropyleneglycol, and the like, polyglycolic acid, cellulose, cellulose ester, and cellulose ether;

5) phosphates and phosphites including diphenyl phosphate, diphenyl phosphite, bis (4-t-butylphenyl) sodium phosphate, methylene (2,4-t-butylphenyl) sodium phosphate, and metal salts thereof;

6) sorbitol derivatives such as bis(p-methylbenzylidene) sorbitol and bis(p-ethylbenzylidene)sorbitol;

7) mannitol and aliphatic esters thereof;

8) thioglycolic anhydride and paratoluenesulfonic acid, and metal salts thereof.

Only one kind of the above-listed crystalline nucleating agents may be adopted, or two or more kinds thereof may be suitably mixed and adopted.

The polyester resin composition of the present invention is produced by synthesizing the crystalline nucleating agent and aliphatic polyester by dispersing the former in the latter in an arbitrary method. The crystalline nucleating agent is dispersed in the aliphatic polyester, for example, by introducing the crystalline nucleating agent while the aliphatic polyester is being produced or kneading the crystalline nucleating agent into the aliphatic polyester. However, the dispersing method is not limited to the above-mentioned methods.

The polyester resin composition is obtained by mixing the aliphatic polyester and crystalline nucleating agent, so that the half value width of an exothermic peak based on annealing crystallization of the aliphatic polyester measured by DSC (differential scanning calorimetry analysis) in an atmosphere of nitrogen at a cooling rate of 3K/min. is preferably not more than 15K, more preferably not more than 10K, and most preferably not more than 8K.

The exothermic peak referred to in the present invention can be measured by an ordinary method using a typical thermal analytical instrument (DSC instrument). A measuring method using DSC, that is, a method of finding an exothermic peak will be described below.

To be more specific, an adding amount of the crystalline nucleating agent is preferably in the range of 0.0001 part by weight to 10 parts by weight inclusive based on 100 parts by weight of aliphatic polyester, and more preferably, in the range of 0.5 part by weight to 5 parts by weight inclusive. It is not preferable when an adding amount is less than 0.0001 part by weight because the effect of the crystalline nucleating agent, such as accelerating a crystallization rare is unsatisfactory. Similarly, it is not preferably when an adding amount is more than 10 parts by weight because there is substantially no improvement in the effect of the crystalline nucleating agent. In other words, the effect cannot be expected for an increased amount of the crystalline nucleating agent, thereby wasting some of the crystalline nucleating agent.

When an aliphatic polyester is analyzed using DSC in an atmosphere of nitrogen at a cooling rate of 3K/min., an exothermic peak appears in the range of 10° C. to 200° C. However, an exothermic peak generally has an extremely wide half value width of 25K, and the minimum width is as wide as 15K. When the cooling rate is accelerated from 3K/min., the exothermic peak shifts toward a low temperature side while broadening the half value width thereof. Thus, the aliphatic polyester without a crystalline nucleating agent retains a slow crystallization rate, resulting in the problem that a desirable molded article may not be obtained.

On the other hand, when the polyester resin composition of the present invention is analyzed by DSC (differential scanning calorimetry) in an atmosphere of nitrogen at a cooling rate of 3K/min., unlike an aliphatic polyester alone, the exothermic peak shifts toward a higher temperature side while narrowing the half value width thereof, thereby making a remarkably acute exothermic peak. Since the crystallization rate of the polyester resin composition of the present invention is high, a desirable molded article can be obtained.

The polyester resin composition has biodegradability, a high crystallization rate, and a desirable moldability. The polyester resin composition is suitably processed by known molding methods, such as extrusion molding, injection molding, hollow molding, vacuum molding, etc., into molded articles such as various items, containers, materials, instruments as well as fibers, films, sheets and the like.

Additives such as a dye, pigment, heat resisting agent, anti-oxidant, weather resisting agent:, smoothing agent, anti-static agent, stabilizer, filler, reinforcement material, flame resisting agent, and plasticizer, or other polymers can be added to the aliphatic polyester to such an extent that does not impair the effect of the present invention as occasion demands. The other polymers may be, but are not limited to, polyolefins such as polyethylene, aromatic polyesters, and the like.

Next, the case where the polyester resin composition is processed into a film or sheet will be explained more specifically.

The polyester resin composition is melted and kneaded under known conditions, and subsequently molded by extrusion molding. The polyester resin composition is processed into a film or sheet, for example, by inflation molding, T-die molding or the like, but the method is not limited to the above-mentioned methods. A film of less than 0.25 mm thickness can be made by inflation molding under the following conditions:

1) a temperature (i.e., molding temperature) of a cylinder and a die of an extruding machine is set in the range of 105° C. to 270° C.;

2) a blow-up ratio of the extruding machine is set in the range of 0.5 to 10. A film of less than 0.25 mm thick or a sheet not less than 0.25 mm thick can be made by the T-die molding under conditions that a temperature (i.e., molding temperature) of a cylinder and a die of an extruding machine is set in the range of 105° C. to 270° C.

A film or sheet (hereinafter referred to as film) thus formed withstands tensile fracture strength of 100 kgf/cm$^2$ or more, thereby rendering the film or sheet available for practical use. If a film cannot withstand a tensile fracture strength of up to 100 kgf/cm$^2$, it cannot be used as a packing material, thereby limiting a range of application, that is, degrading utilization. In addition, a tensile elastic modulus of the film thus formed is preferably in the range of 100 kgf/cm$^2$ to 30,000 kgf/cm$^2$, and more preferably in the range of 1,000 kgf/cm$^2$ to 15,000 kgf/cm$^2$. A film having a tensile elastic modulus of below 100 kgf/cm$^2$ does not have appropriate tension, thereby making it difficult to handle the film. In contrast, a film having a tensile elastic modulus of above 30,000 kgf/cm$^2$ does not have appropriate flexibility, thereby making the film unsuitable for a packing material.

The present invention is explained in a more specific manner by the following examples in comparison with comparative examples not according to the present invention. However, the present invention is not limited to the undermentioned examples. In the following, the unit "part" represents "part(s) by weight".

The number-average molecular weight, loss start temperature, melting point, crystallization temperature, half value width of an exothermic peak of the aliphatic polyester were measured by the methods below. Also, a tensile test and a biodegradability test of the polyester resin composition were performed by the methods below.

Number-Average Molecular Weight

The number-average molecular weight (Mn) of the aliphatic polyester was measured using a gel permeation chromatography under predetermined conditions. The number-average molecular weight referred to herein was calculated as standard polystyrene.

Weight-Loss Starting Temperature

A weight-loss starting temperature (°C.) of the aliphatic polyester was measured in air by a thermo-gravimetric analytical instrument (Shimadzu Seisakusho Ltd. Model: TGA-40) under conditions of a sample amount of 50 mg and a temperature elevation rate of 10K/minute.

Melting Point, Crystallization Temperature, and Half Value Width of Exothermic Peak The melting point Tm (°C.), crystallization temperature Tc (°C.), and half value width $\Delta T$ (K) of an exothermic peak were measured in an atmosphere of nitrogen by a DSC instrument (Seiko Electronics Industry, Co., Ltd. Model: SSC5200). The measurement was carried out in the following manner. 20 mg of sample was completely melted by heating, and then the sample was reverted rapidly to −50 ° C. Thereafter, the sample was heated at a temperature elevation rate of 6K/minute. Then, the endothermic peak was measured. The obtained temperature was determined as a melting point Tm.

Next, the sample was reverted at a cooling rate of 3K/minute, and an exothermic peak based on annealing crystallization of the aliphatic polyester was measured. The obtained temperature was determined as the crystallization temperature Tc, and the half value width $\Delta T$ of the exothermic peak was measured.

Tensile Test

A tensile test of the polyester resin composition was performed in accordance with ASTM-D882-90 (Method A), and a tensile fracture strength (kgf/cm$^2$) , a tensile elastic modulus (kgf/cm$^2$) and fracture elongation (percent) were measured.

Biodegradability

First, a polyester resin composition was molded into a 200 $\mu$m thick film using a compression molding machine under the conditions: molding temperature of 130° C., a molding pressure of 150 kg/cm$^2$, and a molding period of two minutes. Next, the resulting film was buried into a planter in which soil was placed and preserved for 100 consecutive days in a thermohumidstat of 23° C. and relative humidity 65 percent while a defined amount of water was sprinkled on the planter once a day. Thereafter, a change of outside appearance of the film was observed. Here, as the soil, there was used a mixture of soil sampled in Onohara, Minoo-shi, Japan, soil sampled in Nishi-Otabi-cho, Suita-shi, Japan, and leaf mold in the ratio of 3:1:3.

Example 1

Into an autoclave were placed 500.0 parts of succinic anhydride (cyclic acid anhydrice) and 4.90 parts of zirconyl octanoate (catalyst). An inside atmosphere of the autoclave was replaced by nitrogen gas. Then, a temperature of the autoclave was gradually elevated to 130° C. with stirring to dissolve the succinic anhydride. While maintaining a temperature of the autoclave at 130° C. and an inside pressure of the autoclave in a range of 4.0 kgf/cm$^2$ to 8.5 kgf/cm$^2$, 231.1 parts of ethylene oxide (cyclic ether) was successfully (gradually) introduced into the autoclave for 4 hours at the rate of 58 parts an hour. After completion of the introduction of the ethylene oxide, an ageing reaction was performed at 130° C. for 1 hour and then a temperature of the system was reverted to normal temperature, thereby obtaining a high-molecular product.

A procedure, wherein the resulting high-molecular product was dissolved in a defined amount of chloroform and precipitated in a defined amount of tetrahydrofuran for purification, was thrice repeated to obtain an aliphatic polyester at a yield of 99.2 percent.

The resulting aliphatic polyester had a number-average molecular weight of 13,500 and a melting point of 101.2° C. A content of terminal carboxyl group in the polyester was determined by neutralization titration to be 0.0501 mmol/g. The results of the measurements of this example show that a ratio of the terminal carboxyl group of the aliphatic polyester was 33.8 percent.

Into a self-cleaning type twin screw mixer (S1 KRC reactor made by Kurimoto Tekkosho Co., Ltd., inner diameter 25 mm, L/D=10.2), were placed 70.0 parts of the aliphatic polyester, 0.700 part of diphenyl phosphite (chair-elongating agent) and 2.8 parts of talc (crystalline nucleating agent). A reaction was performed in a nitrogen gas current for 2.5 hours under conditions of pressure 0.1 mmHg–0.2 mmHg, jacket temperature 240° C., and mixing rate 100 rpm, thereby obtaining a polyester resin composition.

The resulting polyester resin composition, i.e., polymerized aliphatic polyester had a number-average molecular weight of 52,000, a melting point Tm of 101.6° C., a crystallization temperature Tc of 56.0° C. and a half value width ΔT of an exothermic peak of 4.5K. A chart of differential scanning calorimetry of the polyester resin composition is shown in FIG. 1. In the chart, "h" is an exothermic peak.

The polyester resin composition was melted by heating at 110° C., and a film was formed by inflation molding. In the process of forming the film, problems of film welding to a take-in roll, welding or blocking between films, etc., did not arise. Namely, a desirable moldability was obtained by inflation molding.

The polyester resin composition had biodegradability, and a tensile fracture strength of 210 kgf/cm², a tensile elastic modulus of 3,000 kgf/cm² and a fracture elongation of 150 percent.

The results of measurements and experiments of this example are shown in Table 1. In Table 1 under column "biodegradability", the results were described as follows:

(+): A change of outside appearance was recognized.

(−): A change of outside appearance was not recognized.

Under column "inflation molding", the results were described as follows:

(O): A desirable moldability was obtained.

(X): An unpreferable moldability was obtained.

Example 2

In place of 2.8 parts of talc (crystalline nucleating agent) used in Example 1, 1.4 parts of boron nitride were used as a crystalline nucleating agent. Other than that, the same reaction as Example 1 was performed in the same manner, and a polyester resin composition was obtained.

The resulting polyester resin composition had a number-average molecular weight of 52,000, a melting point Tm of 100.8° C., and a crystallization temperature of 60.5° C. The half value width ΔT of an exothermic peak was 7.2K. The same inflation molding as Example 1 was performed, and a desirable moldability was obtained. In addition, the polyester resin composition had biodegradability, and a tensile fracture strength of 215 kgf/cm², a tensile elastic modulus of 4500 kgf/cm², and a fracture elongation of 140 percent. The results of the measurements and experiments of this example are shown in Table 1.

Example 3

The same reaction as Example 1 was performed in the same manner, and an aliphatic resin composition was obtained.

Into the self-cleaning type twin screw mixer user in Example 1, was placed 70.0 parts of the aliphatic polyester. A reaction was performed in a nitrogen gas current for 3.5 hours under conditions of pressure 0.1 mmHg–0.2 mmHg, jacket temperature 240° C., and mixing rate 100 rpm, thereby obtaining a polymerized aliphatic polyester. The resulting aliphatic polyester had an average molecular weight of 63,500.

Then, into the mixer, were placed 30.0 parts of the polymerized aliphatic polyester and 0.6 part of bis(p-methylbenzylidene)sorbitol as a crystalline nucleating agent, and the mixture was melted by heating at 130 ° C., thereby obtaining a polyester resin composition.

The resulting polyester resin composition had a melting point Tm of 102.8° C., a crystallization temperature Tc of 54.5° C. and a half value width ΔT of an exothermic peak of 7.5K. The inflation molding was performed in the same manner as Example 1, and a desirable moldability was obtained.

The polyester resin composition had biodegradability, and a tensile fracture strength of 260 kgf/cm² a tensile elastic modulus 2,500 kgf/cm² and a fracture elongation of 120 percent. The result of measurements and experiments of this example are shown in Table 1.

Comparative Example 1

The same reaction as Example 1 was performed in the same manner, and a polyester resin composition obtained. The resulting aliphatic polyester had a number-average molecular weight of 52,000, a melting point Tm of 101.8° C., crystallization temperature Tc of 51.5° C. and a half value width ΔT of an exothermic peak of 16.3K. An inflation molding was performed in the same manner as Example 1. However, a desirable molding was not obtained. The results of measurements in this comparative example are shown in Table 1.

TABLE 1

|  | Example 1 | Example 2 | Example 3 | Comparative Example 1 |
|---|---|---|---|---|
| number-average molecular weight (Mn) | 52000 | 52000 | 63500 | 52000 |
| crystalline nucleating agent | talc | boron nitride | *1) | none |
| DSC melting point Tm (°C.) | 101.6 | 100.8 | 102.8 | 101.8 |
| crystallization temperature Tc (°C.) | 56.0 | 60.5 | 54.5 | 51.5 |
| half value width ΔT (K) | 4.5 | 7.2 | 7.5 | 16.3 |
| inflation molding | O | O | O | X |
| tensile test tensile fracture strength (kgf/cm²) | 210 | 215 | 260 | — |
| tensile elastic modulus (kgf/cm²) | 3000 | 4500 | 2500 | — |
| fracture elongation (%) | 150 | 140 | 120 | — |
| Biodegradability | (+) | (+) | (+) | — |

*1) bis(p-methylbenzylidene)sorbitol

Example 4

The same reaction as Example 1 was performed in the same manner, and an aliphatic polyester was obtained.

Into the self-cleaning type twin screw mixer used in Example 1, was placed 70.0 parts of the aliphatic polyester. A reaction was performed in a nitrogen gas current for 3.0 hours under conditions of pressure 0.1 mmHg–0.2 mmHg, jacket temperature 240° C., and mixing rate 100 rpm, thereby obtaining a polymerized aliphatic polyester. The resulting aliphatic polyester had a number-average molecular weight of 51,000.

Next, into the mixer, were placed 30.0 parts of the polymerized aliphatic polyester and 0.6 part of bis(p-methylbenzylidene)sorbitol, and the contents were melted by heating at 130° C., thereby obtaining a polyester resin composition.

The resulting polyester resin composition had a melting point Tm of 102.4° C., a crystallization temperature Tc of 53.5° C. and a half value width ΔT of an exothermic peak of 7.6K. In addition, the polyester resin composition had biodegradability. The results of measurements are shown in Table 2.

Example 5

The same reaction as Example 1 was performed in the same manner, and an aliphatic polyester was obtained.

Into the self-cleaning type twin screw mixer used in Example 1, were placed 70.0 parts of the aliphatic polyester and 0.700 part of diphenyl phosphite. A reaction was performed in a nitrogen gas current for 2.5 hours under conditions of pressure 0.1 mmHg–0.2 mmHg, jacket temperature 240° C., and mixing rate of 100 rpm, thereby obtaining a polymerized aliphatic polyester. The resulting aliphatic polyester had an average molecular weight of 52,000.

Then, into the mixer, were placed 30.0 parts of the polymerized aliphatic polyester and 0.6 part of cellulose (KC flock W-50 available from Nippon Seishi Co., Ltd.) as a crystalline nucleating agent, and the resulting mixture was melted by heating at 130° C., thereby obtaining a polyester resin composition.

The resulting polyester resin composition had a melting point Tm of 101.8° C., a crystallization temperature Tc of 52.4° C. and a half value width ΔT of an exothermic peak of 9.0K. The resulting polyester resin composition had biodegradability. The results of measurements in this example are shown in Table 2.

Example 6

In place of 0.6 part of cellulose used in Example 5 as a crystalline nucleating agent, 0.6 part of polyethylene glycol (molecular weight: 10,000) was used as a crystalline nucleating agent. Other than that, the same reaction as Example 5 was performed in the same manner, and a polyester resin composition was obtained.

The resulting polyester resin composition had a melting point Tm of 100.1° C., a crystallization temperature Tc of 48.1° C. and a half value width ΔT of an exothermic peak of 9.7K. The resulting polyester resin composition had biodegradability. The results of measurements in this example are shown in Table 2.

Example 7

In place of 0.6 part of cellulose used in Example 5 as a crystalline nucleating agent, 1.5 parts of mannitol was used as a crystalline nucleating agent. Other than that, the same reaction as Example 5 was performed in the same manner, and a polyester resin composition was obtained.

The resulting polyester resin composition had a melting point Tm of 101.9° C., a crystallization temperature Tc of 71.7° C. and a half value width ΔT of an exothermic peak of 7.8K. The resulting polyester resin composition had biodegradability. The results of measurements in this example are shown in Table 2.

Example 8

Into an autoclave (reaction vessel), were added 386.2 parts of succinic anhydride and 2.09 parts of tri-iso-propoxyaluminum as a catalyst. An inside atmosphere of the autoclave was replaced by nitrogen gas. Then, a temperature of the autoclave was gradually elevated to 130° C. with stirring to dissolve the succinic anhydride. While maintaining a temperature of the autoclave at 130° C. and an inside pressure of the autoclave at not more than 7.0 kgf/cm$^2$, 187.0 parts of ethylene oxide was successively (gradually) introduced into the reaction system for 2.5 hours at the rate of 75 parts an hour. After the completion of the introduction of ethylene oxide, an ageing reaction was performed at 130° C. for 2.0 hours and then a temperature of the reaction system was reverted to normal temperature, thereby obtaining a high molecular product.

A procedure, wherein the resulting high molecular product was dissolved in a defined amount of chloroform and precipitated in a defined amount of tetrahydrofuran for purification, was thrice repeated to obtain an aliphatic polyester at a yield of 98.2 percent. The resulting aliphatic polyester had an average molecular weight of 20,500 and a melting point of 97.5° C.

To the reaction system, were added 100.0 parts of the aliphatic polyester, and 400 parts of chloroform as a solvent. Then, 1.80 parts of hexamethylene diisocyanate (chain elongating agent) and 1.0 part of dibutyltin dilaurate (urethane catalyst) were added, and reaction was performed in a nitrogen gas current for 1 hour while stirring at 60° C., thereby obtaining a high-molecular aliphatic polyester. The high-molecular aliphatic polyester had a number-average molecular weight of 45,000.

Next, into the mixer, were placed 30.0 parts of the high-molecular aliphatic polyester and 1.2 parts of talc, and were melted by mixing at 130° C., thereby obtaining a polyester resin composition.

The resulting polyester resin composition had a melting point Tm of 97.3° C., a crystallization temperature Tc of 47.1° C. and a half value width ΔT of an exothermic peak of 9.0K. The resulting polyester resin composition exhibited biodegradability. The results of measurements in this example are shown in Table 2.

Example 9

A one-liter separable flask provided with a thermometer, an agitator, a nitrogen introducing tube and a flow dividing condenser was prepared. Into the flask were placed 300.0 parts of succinic anhydride (aliphatic dicarboxylic acid), 195.0 parts of ethylene glycol (aliphatic glycol) and 0.54 part of tetra-iso-propoxytitanium (catalyst). Then, an inside atmosphere of the autoclave was replaced by nitrogen gas. Next, the mixture in the flask was reacted with stirring at a temperature in the range of 150° C. to 220° C. for 6.5 hours, and the mixture was further reacted at a pressure in the range of 0.1 mmHg to 10 mmHg while maintaining a temperature in the range of 70° C. to 210° C. for 16 hours, thereby obtaining an aliphatic polyester. The resulting aliphatic polyester had a number-average molecular weight of 13,300.

Into the self-cleaning type twin screw mixer used in Example 1, was placed 70.0 parts of the aliphatic polyester.

Then, a reaction was performed in a nitrogen gas current for 7.0 hours under conditions of pressure 0.7 mmHg–1.0 mmHg, jacket temperature 200° C., and mixing rate 100 rpm, thereby obtaining a polymerized aliphatic polyester. The resulting aliphatic polyester had an average molecular weight of 65,400.

Next, into the mixer, were placed 30.0 parts of polymerized aliphatic polyester and 1.2 parts of talc, and the resulting mixture was melted by heating at 130° C., thereby obtaining a polyester resin composition.

The resulting polyester resin composition had a melting point Tm of 105.3° C., a crystallization temperature Tc of 58.0° C. and a half value width $\Delta T$ of an exothermic peak of 6.5K. An inflation molding was performed in the same manner as Example 1, and a desirable moldability was obtained. The results of measurements are shown in Table 2.

Comparative Example 2

The same reaction as Example 4 was performed in the same manner, and a polymerized aliphatic polyester composition was obtained. A number-average molecular weight of the resulting aliphatic polyester was 51,000. In addition, the aliphatic polyester had biodegradability, and a melting point Tm of 100.8° C., and a crystallization temperature Tc of 40.8° C. However, a half value width $\Delta T$ of an exothermic peak was 25.3K, resulting in a low crystallization rate. The results of measurements in this comparative example are shown in Table 2.

Comparative Example 3

The same reaction as Example 9 was performed in the same manner, and a polymerized aliphatic polyester composition was obtained. A number-average molecular weight of the resulting aliphatic polyester was 65,400. In addition, the aliphatic polyester had biodegradability, a melting point Tm of 105.0° C., and a crystallization temperature Tc of 44.0° C. However, a half value width $\Delta T$ of an exothermic peak was 23.0K, resulting in low crystallization rate. The results of measurements in this comparative example are shown in Table 2.

Comparative Example 4

In place of 0.6 part of bis(p-methylbenzylidene)sorbitol used in Example 4, 0.6 part of silica (AEROSIL 200 from NIPPON AEROSIL CO., LTD) that is a filler was used as a comparative crystalline nucleating agent. Other than that, the same reaction as Example 4 was performed in the same manner, and a comparative polyester resin composition was obtained.

A number-average molecular weight of the polyester resin composition was 51,000. In addition, the polyester resin composition had biodegradability, a melting point Tm of 102.2° C., and a crystallization temperature Tc of 45.2° C. However, a half value width $\Delta T$ of an exothermic peak was 22.7K, resulting in low crystallization rate. The results of measurements in this comparative example are shown in Table 2.

TABLE 2

| | Example 4 | Example 5 | Example 6 | Example 7 |
|---|---|---|---|---|
| number-average molecular weight (Mn) | 51000 | 52000 | 52000 | 52000 |
| crystalline nucleating agent | *1) | cellulose | *2) | mannitol |
| DSC melting point Tm (°C.) | 102.4 | 101.8 | 100.1 | 101.9 |
| crystallization temperature Tc (°C.) | 53.5 | 52.4 | 48.1 | 71.7 |
| half value width $\Delta T$ (K) | 7.6 | 9.0 | 9.7 | 7.8 |
| Biodegradability | (+) | (+) | (+) | (+) |

| | Example 8 | Example 9 | Comparative Example 2 | Comparative Example 3 | Comparative Example 4 |
|---|---|---|---|---|---|
| number-average molecular weight (Mn) | 45000 | 65400 | 51000 | 65400 | 51000 |
| crystalline nucleating agent | talc | talc | none | none | silica |
| DSC Tm (°C.) | 97.3 | 105.3 | 100.8 | 105.0 | 102.2 |
| Tc (°C.) | 47.1 | 58.0 | 40.8 | 44.0 | 45.2 |
| $\Delta T$ (K) | 9.0 | 6.5 | 25.3 | 23.0 | 22.7 |
| Biodegradability | (+) | (+) | (+) | (+) | (+) |

*1) bis(p-methylbendiriden)sorbitol
*2) polyethylene glycol

Example 10

Into an autoclave (reaction vessel), were placed 500.0 parts of purified succinic anhydride by distillation and 3.68 parts of zirconyl octanoate. An inside atmosphere of the autoclave was replaced by nitrogen gas. Then, a temperature of the autoclave was gradually elevated to 130° C. with stirring to dissolve the succinic anhydride. While maintaining a temperature of the autoclave at 130° C. and an inside pressure of the autoclave in a range of 4.0 to 6.5 kgf/cm$^2$, 231.1 parts of ethylene oxide was successively (gradually) introduced into the autoclave for 4.0 hours at a rate of 58 parts an hour. After the completion of the introduction of ethylene oxide, an ageing reaction was performed at 130° C. for 1 hour and then a temperature of a system was reverted to normal temperature, thereby obtaining an aliphatic polyester. The resulting aliphatic polyester had a number-average molecular weight of 36,000 and a melting point of 103.4° C.

Next, a 50 ml separable flask provided with a thermometer, an agitator, a nitrogen introducing tube and a suction tube was prepared. Into the flask, were placed 12.0 parts of the aliphatic polyester. Then, an inside atmosphere of the autoclave was replaced by nitrogen gas three times. The suction tube was connected to a vacuum tube through a trap. The trap was dipped into a cooling fluid (dry ice-methanol). Next, the mixture in the flask was reacted with stirring at 240° C. and at a pressure in the range of 0.9 mmHg to 1.1 mmHg for 1.5 hours, thereby obtaining a polyester resin composition.

The resulting aliphatic polyester had a number-average molecular weight of 68,000, a melting point Tm of 103.1° C., and a weight-loss starting temperature of 282.8° C. Thus, a difference in temperature between the melting point Tm and the weight-loss starting temperature of 179.7K was given. FIG. 2 shows a chart showing results of measurements by thermo-gravimetric analysis (TG) of the polyester resin composition. FIG. 3 is a chart showing results of differential scanning calorimetry (DSC) of the polyester resin composition of FIG. 2. As can be seen from FIG. 2, a weight-loss starting temperature is given by a temperature at an intersection between two tangent lines A and B.

In addition, the polyester resin composition obtained from this example had biodegradability, and a tensile fracture strength of 270 kgf/cm² and a fracture elongation of 180 percent. The results of measurements and experiments are shown in Table 3.

Example 11

In place of 3.68 parts of zirconyl octanoate used in Example 10 as a catalyst, 3.70 parts of tetra-t-butoxyzirconium was used as a catalyst. Other than the above, the same reaction as Example 10 was performed in the same manner, and a polyester resin composition was obtained.

The resulting polyester resin composition had a number-average molecular weight of 65,000, a melting point Tm of 103.5° C., and a loss starting temperature of 279.3° C. Thus, a difference in temperature between the melting point Tm and the weight-loss starting temperature of 175.8K was given.

In addition, the polyester resin composition obtained from this example had biodegradability, and a tensile fracture strength of 255 kgf/cm² and a fracture elongation of 170 percent. The results of measurements and experiments are shown in Table 3.

Comparative Example 5

Properties of polylactic acid (weight-average molecular weight (Mw) : 300,000) as an example of a conventional polyester resin composition were measured. As a result, the polylactic acid had a melting point Tm of 176.3° C., and a loss starting temperature of 200.8° C. Thus, a difference in temperature between the melting point Tm and the weight-loss starting temperature of 24.5K was given. From the results of this comparative example, it has been found that when adopting the polylactic acid, a precise temperature control would be required during a molding process which requires a great deal of labor force.

TABLE 3

|  | Example 8 | Example 9 | Comparative Example 5 |
|---|---|---|---|
| number-average molecular weight (Mn) | 68000 | 65000 |  |
| weight-average molecular weight (Mw) |  |  | 300000 |
| DSC meltine point Tm (°C.) | 103.1 | 103.5 | 176.3 |
| TG weight-loss starting temperature (°C.) | 282.8 | 279.3 | 200.8 |
| difference in temperature between Tm and weight-loss starting temp (°C.) | 179.7 | 175.8 | 24.5 |
| tensile test tensile fracture strength (kgf/cm²) | 270 | 255 | — |
| fracture elongation (%) | 180 | 170 | — |
| Biodegradability | (+) | (+) | (+) |

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A polyester resin composition, comprising:
   an aliphatic polyester having a number-average molecular weight in a range of 10,000 to 100,000; and
   a crystalline nucleating agent in an amount of 0.5 part by weight—5 parts by weight based on 100 parts by weight of said aliphatic polyester,
   wherein said polyester resin composition has a half value width of an exothermic peak based on an annealing crystallization of said polyester resin composition measured by differential scanning calorimetry in an atmosphere of nitrogen at a cooling rate of 3K/minute of not more than 15K.

2. The polyester resin composition as set forth in claim 1, wherein:
   after forming said polyester resin composition, said crystalline nucleating agent has an average particle diameter of not more than 50 μm.

3. The polyester resin composition as set forth in claim 1, wherein:
   after forming said polyester resin composition, said crystalline nucleating agent has an average particle diameter of not more than 10 μm.

4. The polyester resin composition as set forth in claim 1, wherein:
   wherein said aliphatic polyester has a number-average molecular weight in a range of 25,000 to 80,000.

5. The polyester resin composition as set forth in claim 1, wherein:
   wherein said aliphatic polyester has a number-average molecular weight in a range of 40,000 to 70,000.

6. The polyester resin composition as set forth in claim 1, wherein:
   said aliphatic polyester and said crystalline nucleating agent are mixed such that the half value width is not more than 10K.

7. The polyester resin composition as set forth in claim 1, wherein:
   said aliphatic polyester and said crystalline nucleating agent are mixed such that the half value width is not more than 8K.

8. The polyester resin composition as set forth in claim 1, wherein:
   said aliphatic polyester is formed by a polycondensation reaction of aliphatic dicarboxylic acid and aliphatic glycol.

9. The polyester resin composition as set forth in claim 1, wherein:
   said aliphatic polyester is formed by a polycondensation reaction of aliphatic dicarboxylic acid having 2–6 carbon atoms and aliphatic glycol having 2–4 carbon atoms.

10. The polyester resin composition as set forth in claim 1, wherein:
    said aliphatic polyester is formed by a polycondensation reaction of succinic acid and ethylene glycol and/or 1,4-butandiol.

11. A polyester resin composition, comprising:
    an aliphatic polyester formed by a ring-opening polymerization reaction of cyclic ether having a number-average molecular weight in a range of 10,000 to 100,000; and
    a crystalline nucleating agent, wherein said polyester resin composition has a half value width of an exothermic peak based on an annealing crystallization of said polyester resin composition measured by differential scanning calorimetry in an atmosphere of nitrogen at a cooling rate of 3K/minute of not more than 15K.

12. A polyester resin composition, comprising:

an aliphatic polyester having a difference in temperature between a weight-loss starting temperature measured by thermo-gravimetric analysis in air and a melting point measured by differential scanning calorimetry in an atmosphere of nitrogen of not less than 100K; said aliphatic polyester having a number molecular weight in a range of 10,000 to 100,000, and a crystalline nucleating agent in an amount of 0.5 part by weight—5 parts by weight based on 100 parts by weight of said aliphatic polyester.

13. The polyester resin composition as set forth in claim 11, wherein:

a mole ratio of said cyclic acid anhydride to said cyclic ether (cyclic acid anhydride/cyclic ether) is in a range of 40/60–60/40.

14. The polyester resin composition as set forth in claim 11, wherein:

said cyclic acid anhydride includes succinic anhydride.

15. The polyester resin composition as set forth in claim 11, wherein:

said cyclic ether includes ethylene oxide.

16. The polyester resin composition as set forth in claim 1, wherein:

said aliphatic polyester is formed by a ring-opening polymerization reaction of succinic anhydride and ethylene oxide.

17. The polyester resin composition as set forth in claim 1, wherein:

said aliphatic polyester is formed by a ring-opening polymerization reaction of cyclic ether.

18. The polyester resin composition as set forth in claim 1, further comprising:

an additive.

19. The polyester resin composition as set forth in claim 1, wherein:

said polyester resin composition is formed in a film.

20. The polyester resin composition as set forth in claim 1, wherein:

said polyester resin composition is formed in a film having a tensile fracture strength of not less than 100 $kgf/cm^2$.

21. The polyester resin composition as set forth in claim 1, wherein:

said polyester resin composition is formed in a film having a tensile elastic molulus in a range of 100 $kgf/cm^2$ to 30,000 $kgf/cm^2$.

22. The polyester resin composition as set forth in claim 12, wherein:

after forming said polyester resin composition, said crystalline nucleating agent has an average particle diameter of not more than 50 $\mu$m.

23. The polyester resin composition as set forth in claim 12, wherein:

after forming said polyester resin composition, said crystalline nucleating agent has an average particle diameter of not more than 10 $\mu$m.

24. The polyester resin composition as set forth in claim 12, wherein:

wherein said aliphatic polyester has a number-average molecular weight in a range of 25,000 to 80,000.

25. The polyester resin composition as set forth in claim 12, wherein:

wherein said aliphatic polyester has a number-average molecular weight in a range of 40,000 to 70,000.

26. The polyester resin composition as set forth in claim 12, wherein:

said aliphatic polyester is formed by a polycondensation reaction of aliphatic dicarboxylic acid and aliphatic glycol.

27. The polyester resin composition as set forth in claim 12, wherein:

said aliphatic polyester is formed by a polycondensation reaction of aliphatic dicarboxylic acid having 2–6 carbon atoms and aliphatic glycol having 2–4 carbon atoms.

28. The polyester resin composition as set forth in claim 12, wherein:

said aliphatic polyester is formed by a polycondensation reaction of succinic acid and ethylene glycol and/or 1,4-butandiol.

29. A polyester resin composition, comprising:

an aliphatic polyester formed by a ring-opening polymerization reaction of cyclic acid anhydride and cyclic ether and having a difference in temperature between a weight-loss starting temperature measured by thermo-gravimetric analysis in air and a melting point measured by differential scanning calorimetry in an atmosphere of nitrogen of not less than 100K; said aliphatic polyester having a number molecular weight in a range of 10,000 to 100,000, and a crystalline nucleating agent.

30. The polyester resin composition as set forth in claim 29, wherein:

a mole ratio of said cyclic acid anhydride to said cyclic ether (cyclic acid anhydride/cyclic ether) is in a range of 40/60–60/40.

31. The polyester resin composition as set forth in claim 29, wherein:

said cyclic acid anhydride includes succinic anhydride.

32. The polyester resin composition as set forth in claim 29, wherein:

said cyclic ether includes ethylene oxide.

33. The polyester resin composition as set forth in claim 12, wherein:

said aliphatic polyester is formed by a ring-opening polymerization reaction of succinic anhydride and ethylene oxide.

34. The polyester resin composition as set forth in claim 12, wherein:

said aliphatic polyester is formed by a ring-opening polymerization reaction of cyclic ether.

35. The polyester resin composition as set forth in claim 12, further comprising:

an additive.

36. The polyester resin composition as set forth in claim 12, wherein:

said polyester resin composition is formed in a film.

37. The polyester resin composition as set forth in claim 12, wherein:

said polyester resin composition is formed in a film having a tensile fracture strength of not less than 100 $kgf/cm^2$.

38. The polyester resin composition as set forth in claim 12, wherein:

said polyester resin composition is formed in a film having a tensile elastic molulus in a range of 100 $kgf/cm^2$ to 30,000 $kgf/cm^2$.

* * * * *